United States Patent
Wong et al.

(10) Patent No.: US 10,638,480 B2
(45) Date of Patent: Apr. 28, 2020

(54) TELECOMMUNICATIONS APPARATUSES AND METHODS

(71) Applicant: SONY CORPORATION, Tokyo (JP)

(72) Inventors: Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 15/751,645

(22) PCT Filed: Sep. 23, 2016

(86) PCT No.: PCT/EP2016/072743
§ 371 (c)(1),
(2) Date: Feb. 9, 2018

(87) PCT Pub. No.: WO2017/050996
PCT Pub. Date: Mar. 30, 2017

(65) Prior Publication Data
US 2018/0242320 A1    Aug. 23, 2018

(30) Foreign Application Priority Data

Sep. 25, 2015  (EP) .................................... 15186972

(51) Int. Cl.
*H04W 72/04* (2009.01)
*H04L 5/00* (2006.01)
(Continued)

(52) U.S. Cl.
CPC ........... *H04W 72/0453* (2013.01); *H04L 1/08* (2013.01); *H04L 1/1812* (2013.01);
(Continued)

(58) Field of Classification Search
CPC ....... H04L 1/08; H04L 1/1812; H04L 1/1829; H04L 1/1861; H04L 5/0055;
(Continued)

(56) References Cited

U.S. PATENT DOCUMENTS

| | | | |
|---|---|---|---|
| 2008/0170634 A1* | 7/2008 | Kwak | .................. H04L 1/1607 375/260 |
| 2009/0073922 A1 | 3/2009 | Malladi et al. | |

(Continued)

FOREIGN PATENT DOCUMENTS

| | | |
|---|---|---|
| GB | 2505696 A | 3/2014 |
| WO | WO 2015/066645 A1 | 5/2015 |

OTHER PUBLICATIONS

International Search Report dated Dec. 16, 2016 in PCT/EP2016/072743 filed Sep. 23, 2016.

(Continued)

*Primary Examiner* — Sithu Ko
*Assistant Examiner* — Nourali Mansoury
(74) *Attorney, Agent, or Firm* — Xsensus LLP (57) ABSTRACT

A method of transmitting an acknowledgment signal in a mobile telecommunications system, the system including a base station and a terminal operable to communicate with the base station via a wireless interface, the wireless interface having a first frequency band and a second frequency band, wherein the first frequency band is different from the second frequency band. The method includes: determining that, at a time t, an acknowledgment signal is to be transmitted by the base station to the terminal in the second frequency band; and if it is determined that, at the time t, a downlink signal is to be transmitted to the terminal, wherein the downlink signal is to be transmitted to the terminal in a first frequency band, then transmitting a multiplexed signal by multiplexing the acknowledgment signal with the downlink signal and transmitting the multiplexed signal in the first frequency band.

16 Claims, 6 Drawing Sheets

(51) Int. Cl.
*H04L 1/18* (2006.01)
*H04L 1/08* (2006.01)
*H04W 92/10* (2009.01)

(52) U.S. Cl.
CPC .......... *H04L 1/1829* (2013.01); *H04L 1/1854* (2013.01); *H04L 1/1858* (2013.01); *H04L 1/1861* (2013.01); *H04L 1/1864* (2013.01); *H04L 5/0044* (2013.01); *H04L 5/0055* (2013.01); *H04W 72/042* (2013.01); *H04W 92/10* (2013.01)

(58) Field of Classification Search
CPC ... H04L 1/1854; H04L 1/1858; H04L 1/1864; H04L 5/0044; H04L 5/001; H04W 72/0453; H04W 72/042; H04W 92/10
See application file for complete search history.

(56) References Cited

U.S. PATENT DOCUMENTS

| | | | | |
|---|---|---|---|---|
| 2009/0201871 | A1* | 8/2009 | Sambhwani | H04W 72/0406 370/329 |
| 2010/0054188 | A1* | 3/2010 | Matsumoto | H04L 1/1671 370/328 |
| 2011/0149901 | A1* | 6/2011 | Kim | H04L 1/1607 370/330 |
| 2012/0069826 | A1* | 3/2012 | Nakao | H04L 5/0007 370/336 |
| 2013/0250895 | A1* | 9/2013 | Malladi | H04L 1/0004 370/329 |
| 2013/0308593 | A1* | 11/2013 | Takeda | H04L 1/1692 370/329 |
| 2013/0336300 | A1* | 12/2013 | Choi | H04L 1/1861 370/336 |
| 2014/0064237 | A1 | 3/2014 | Lee et al. | |
| 2014/0146738 | A1 | 5/2014 | Morioka et al. | |
| 2015/0181575 | A1 | 6/2015 | Ng et al. | |
| 2015/0208340 | A1 | 7/2015 | Webb et al. | |
| 2015/0223240 | A1* | 8/2015 | Choi | H04L 1/1861 370/329 |

OTHER PUBLICATIONS

"3rd Generation Partnership Project; Technical Specification Group Services and System Aspects; Service requirements for Machine-Type Communications (MTC); Stage 1 (Release 13)" 3GPP TS 22.368 V13.1.0, Dec. 2014, pp. 1-26.

Harri Holma, et al., "LTE for UMTS OFDMA and SC-FDMA Based Radio Access", John Wiley and Sons, 2009, 4 Pages.

* cited by examiner

FIG. 11

TELECOMMUNICATIONS APPARATUSES AND METHODS

CROSS-REFERENCE TO RELATED APPLICATIONS

The present application is based on PCT filing PCT/EP2016/072743 filed Sep. 23, 2016, and claims priority to European Patent Application 15 186 972.4, filed in the European Patent Office on Sep. 25, 2015, the entire contents of each of which being incorporated herein by reference.

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customers home and periodically transmit data back to a central MTC server relating to the customers consumption of a utility such as gas, water, electricity and so on. Smart metering is merely one example of potential MTC device applications. Further information on characteristics of MTC-type devices can be found, for example, in the corresponding standards, such as 3GPP TS 22.368 version 13.1.0 Release 13 (2014-12) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

Amongst the techniques proposed to reduce the complexity, cost and power consumption of such devices, a first one is the restriction of the frequency band that the devices operate on. Currently, it has been proposed that a Low Complexity ("LC") terminal would operate in a bandwidth of no more than 6 Physical Resource Blocks "PRBs". In LTE, 6 PRBs correspond to bandwidth of 1.4 MHz. When a limited bandwidth is provided for a terminal with limited capabilities to operate on is provided, it is often referred to as a "narrowband". The bandwidth of the telecommunication system can therefore be divided into multiple 6 PRBs narrowbands and an LC-MTC terminal is expected to be able to tune into any of these narrowbands.

Another technique to increase coverage for MTC and LC-MTC devices is the use of repetitions. In this Coverage Enhancement (CE) feature, the coverage for LC-MTC can be extended by up to 15 dB (relative to that of Cat-1 terminal) by repeating the symbols or messages transmitted to the LC-MTC. Using numerous repetitions of the same information, the coverage provided by the base station can be extended.

While the narrowband technique enables a simplification of the terminal by reducing the operative bandwidth, thereby reducing costs, complexity and power consumption, integrating narrowband terminals in a legacy system that has been conceived and designed with full-bandwidth terminals in mind can be challenging and it can prove difficult for a LC terminal to operate normally when it is not able to receive signals across the entire bandwidth of the system.

SUMMARY

According to a first example aspect, there is provided a method of transmitting an acknowledgment signal in a mobile telecommunications system, the system comprising a base station and a terminal operable to communicate with the base station via a wireless interface, the wireless interface having a first frequency band and a second frequency band, wherein the first frequency band is different from the second frequency band. The method comprises: determining that, at a time t, an acknowledgment signal is to be transmitted by the base station to the terminal in the second frequency band; and if it is determined that, at the time t, a downlink signal is to be transmitted to the terminal, wherein the downlink signal is to be transmitted to the terminal in a first frequency band, then transmitting a multiplexed signal by multiplexing the acknowledgment signal with the downlink signal and transmitting the multiplexed signal in the first frequency band.

Accordingly, when time conflict between a downlink signal (e.g. carried by a downlink shared channel) and an acknowledgment signal is detected, the two signals may be multiplexed and transmitted to the terminal. Also, when it is determined that at time t a downlink signal is to be transmitted, the transmission of the downlink signal may have started earlier than time t, or may start at time t. Likewise, when it is determined that at time t an acknowledgment signal is to be transmitted, the transmission of the acknowledgment signal may have started earlier than time t, or may start at time t. In other words, at the same time, both an acknowledgment signal and DL signal are to be transmitted to the terminal in two different frequency bands and rather than transmitting the signals in their respective bands, the two signals are multiplexed and the multiplexed signal is transmitted in one of the bands.

According to a second example aspect, there is provided a method of transmitting an acknowledgement signal in a mobile telecommunications system, the system comprising a base station and a terminal operable to communicate with the base station via a wireless interface. The method comprises: determining that, at a time t, an acknowledgment signal is to be transmitted by the base station to the terminal; unless the base station is transmitting a downlink signal to the terminal at the time t and in a first frequency band, transmitting the acknowledgement signal in a second frequency band different from the first frequency band; and if the base station is transmitting a downlink signal to the terminal at the time t and in a first frequency band, transmitting a multiplexed signal by multiplexing the acknowledgment signal with the downlink signal in the first frequency band.

According to a third example aspect, there is provided a base station for use in a mobile telecommunications system, the system comprising the base station and a terminal operable to communicate with the base station via a wireless interface, the wireless interface having a first frequency band and a second frequency band, wherein the first frequency band is different from the second frequency band. The base station comprises a transmitter, a receiver and a controller, the controller being configured to: determine that, at a time t, an acknowledgment signal is to be transmitted by the base station to the terminal in the second frequency band; and transmit, via the transmitter and upon determination that at the time t a downlink signal is to be transmitted to the terminal in the first frequency band, a multiplexed signal by multiplexing the acknowledgment signal with the downlink signal and transmitting the multiplexed signal in the first frequency band.

According to a fourth example aspect, there is provided circuitry for a base station for use in a mobile telecommunications system, the system comprising the base station and a terminal operable to communicate with the base station via a wireless interface, the wireless interface having a first frequency band and a second frequency band, wherein the first frequency band is different from the second frequency band. The circuitry comprises a controller element and a transceiver element configured to operate together to: determine that, at a time t, an acknowledgment signal is to be transmitted by the base station to the terminal in the second frequency band; and transmit, upon determination that at the time t a downlink signal is to be transmitted to the terminal in the first frequency band, a multiplexed signal by multiplexing the acknowledgment signal with the downlink signal and transmitting the multiplexed signal in the first frequency band.

According to a fifth example aspect, there is provided a method of operating a base station in a mobile telecommunications system, the system comprising the base station and a terminal operable to communicate with the base station via a wireless interface, the wireless interface having a first frequency band and a second frequency band, wherein the first frequency band is different from the second frequency band. The method comprises: determining that, at a time t, an acknowledgment signal is to be transmitted by the base station to the terminal in the second frequency band; transmitting, upon determination that at the time t a downlink signal is to be transmitted to the terminal in the first frequency band, a multiplexed signal by multiplexing the acknowledgment signal with the downlink signal and transmitting the multiplexed signal in the first frequency band.

According to a sixth example aspect, there is provided a terminal for use in a mobile telecommunications system, the system comprising a base station and the terminal operable to communicate with the base station via a wireless interface. The terminal comprises a transmitter, a receiver and a controller, the controller being configured to receive via the receiver a first signal in a first frequency band; detect that the received signal is a multiplexed signal multiplexing a downlink signal with an acknowledgment signal; and de-multiplex the received signal to extract the downlink signal and the acknowledgment signal.

According to a seventh example aspect, there is provided circuitry for a terminal for use in a mobile telecommunications system, the system comprising a base station and the terminal operable to communicate with the base station via a wireless interface. The circuitry comprises a controller element and a transceiver element configured to operate together to: receive a first signal in a first frequency band; detect that the received signal is a multiplexed signal multiplexing a downlink signal with an acknowledgment signal; and de-multiplex the received signal to extract the downlink signal and the acknowledgment signal.

According to an eighth example aspect, there is provided method of operating a terminal in a mobile telecommunications system, the system comprising a base station and the terminal operable to communicate with the base station via a wireless interface. The method comprises: receiving a first signal in a first frequency band; detecting that the received signal is a multiplexed signal multiplexing a downlink signal with an acknowledgment signal; and de-multiplexing the received signal to extract the downlink signal and the acknowledgment signal.

According to a ninth and tenth example aspect, there is provided computer software which, when executed by a computer, causes the computer to perform any of the above methods and a storage medium which stores the computer software, respectively.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
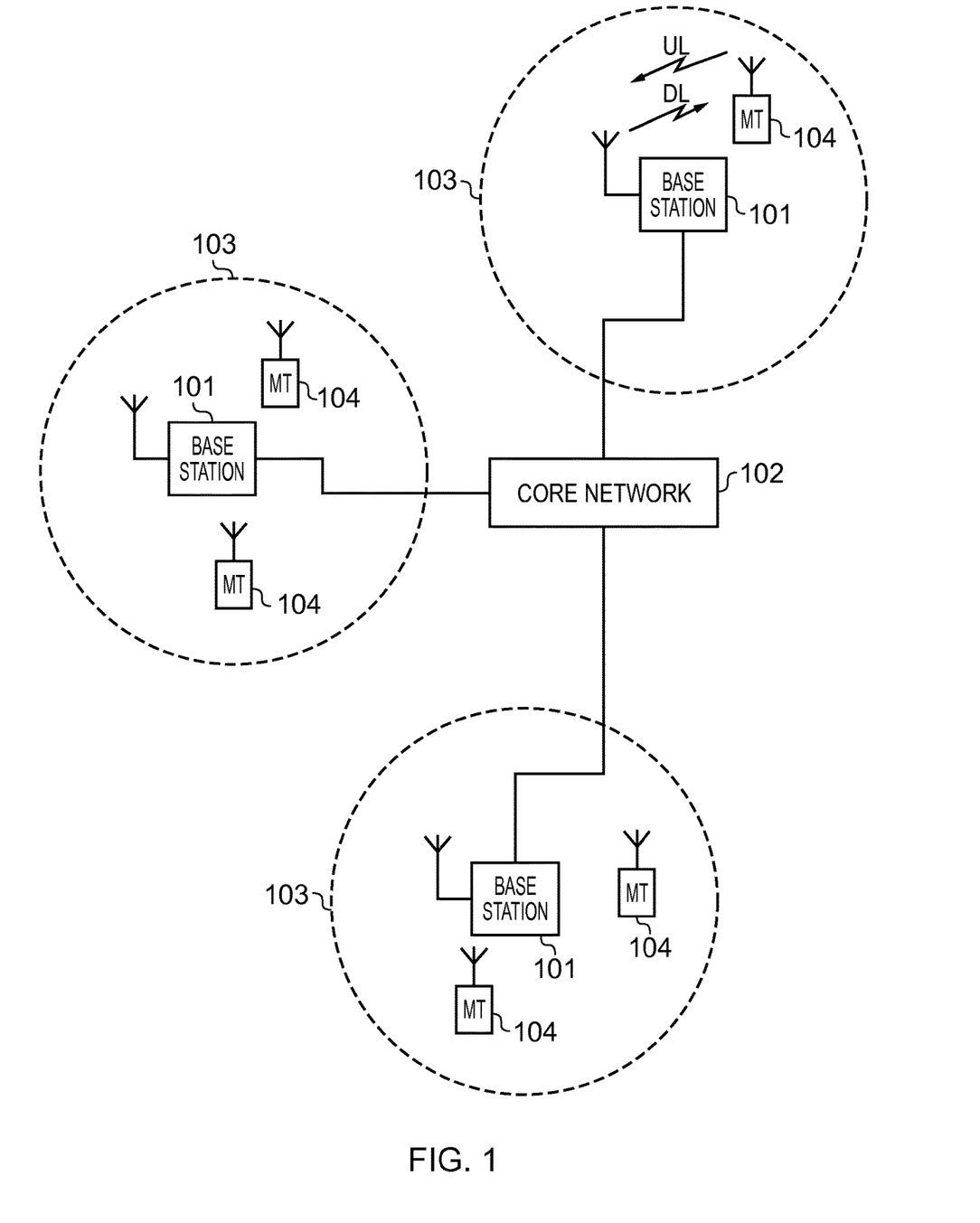
FIG. 1 provides a schematic diagram illustrating an example of a mobile telecommunication system.

FIG. 1 provides a schematic diagram illustrating some basic functionality of a mobile (cellular) telecommunications network/system, in this example operating generally in accordance with LTE principles, and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma, H. and Toskala, A. [2]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network. The core network 102 routes data to and from the terminal devices 104 via the respective base stations 101 and provides functions such as authentication, mobility management, charging and so on. In addition to the base stations 101 and terminal devices 104, the system 100 may further comprises one or more relay nodes/devices. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, mobile terminal, mobile device and so forth. Similarly, base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

With MTC terminals, the terminals are less likely to be mobile (e.g. smart meters), although this is not a requirement, and are less likely to require low latency high-throughput communications such that limiting the capabilities of the terminals, e.g. to use narrowbands, may not be as problematic for them as it can be for conventional terminals. However, amongst the challenges faced by a narrowband terminal is the problem that the terminal can only use one narrowband at a time. In a case where a LC terminal is communicating with the base station both on the uplink and on the downlink, this can however result in a conflict in acknowledgement messages for the terminal and downlink messages for the terminal.

Figure 2:
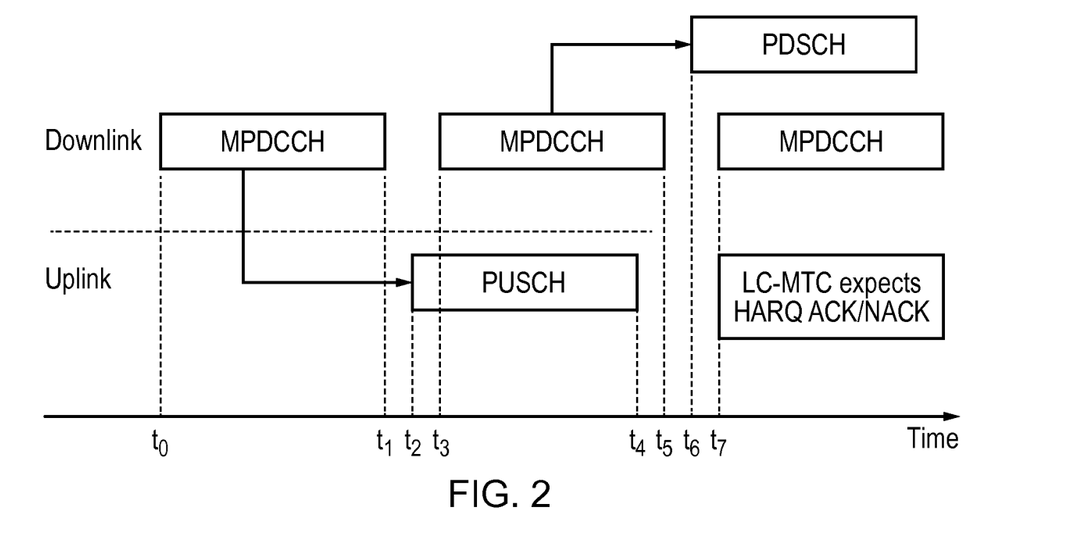
FIG. 2 illustrates an example situation of a PDSCH and HARQ ACK/NACK conflict.

For example, FIG. 2 illustrates an example situation of a PDSCH and HARQ ACK/NACK conflict. Conventionally, in an LTE environment, the base station can transmit a Downlink Control Information (DCI) message to the terminal which can for example contain an uplink grant to schedule resources for the terminal on the Physical Uplink Shared Channel (PUSCH) or a downlink grant to schedule resources for the terminal on the Physical Downlink Shared Channel (PDSCH). The DCI is carried by the Enhanced Physical Downlink Control Channel (EPDCCH) or by the Physical Downlink Control Channel (PDCCH). A HARQ retransmission scheme is used for uplink transmissions that used PUSCH where the PUSCH transmissions are acknowledged by the base station using either a Physical Hybrid-ARQ Indicator Channel (PHICH)—generally for non-adaptive HARQ- or a DCI—generally for adaptive HARQ. In an LC-MTC environment, a DCI is generally carried by an MTC-PDCCH (MPDCCH), where the design of the MPDCCH is based on the legacy EPDCCH. It is noteworthy that in a case where CE is applied, the messages transmitted via the MPDCCH are repeated a plurality of times. Likewise, messages transmitted on the PDSCH and the messages for the HARQ ACK/NACK are also repeated in order to extend their coverage. In an LC-MTC environment, the HARQ ACK/NACK messages may be carried by a PHICH/ePHICH message or a DCI message (on the MPDCCH) that can carry only HARQ ACK/NACK. Presently, once the transmission of a DCI message including an uplink grant (including all required repetitions if appropriate) on the MPDCCH ends at subframe n, the transmission of the corresponding PUSCH message (including all repetitions if appropriate) starts at subframe n+4. If the DCI message includes a downlink grant instead, the transmission of the downlink message on the PDSCH (including all repetitions if appropriate) starts at subframe n+k, where k≥1 and, generally k=1 or k=2. The PDSCH may be transmitted using a different narrowband to that used for the MPDCCH. The MPDCCH may explicitly indicate to the UE (using the DCI), the narrowband used for the PDSCH. Accordingly, once the terminal has received the uplink or downlink grant, it can adjust its receiver to receive signals on the corresponding narrowband and the terminal can thus receive, at any point in time, messages on the appropriate narrowband, thereby operating with a limited bandwidth for its receiver. A situation may occur, as illustrated in FIG. 2, where a terminal transmits an uplink message on a PUSCH (or equivalent) and can also receive shortly after a downlink grant (via a DCI) for receiving a downlink message on a PDSCH. This can maximise scheduling opportunities and optimise the terminal's throughput, whether the terminal is an LC-MTC terminal or not. The figure shows the time period $t_2$ to $t_4$ overlapping the time period $t_3$ to $t_5$, but the system may also be arranged such that the time period $t_2$ to $t_4$ does not overlap the time period $t_3$ to $t_5$; and the conflict described hereafter can also occur in this case.

However, this could also cause a conflict in the downlink transmissions, as shown in FIG. 2. At a time $t_0$, an MPDCCH carrying an uplink grant is transmitted to the terminal, e.g. with repetitions. This MPDCCH transmission (with all appropriate repetitions) ends at a time $t_1$ and at a time $t_2$ (e.g. four subframes later), the LC-MTC terminal that received this uplink grant begins transmission on the corresponding PUSCH. At a time $t_3$, another MPDCCH repetition starts which includes a downlink grant for the same LC-MTC terminal, with a transmission on the PDSCH scheduled for this LC-MTC terminal at a time $t_6$ (after the end of DCI repetition on the MPDCCH at a time $t_5$). While receiving the DCI on the MPDCCH the uplink transmission on the PUSCH ends at a time $t_4$. Assuming that the HARQ ACK/NACK (for the uplink message sent on the PUSCH) is sent in the form of a DCI, this LC-MTC terminal would expect this HARQ ACK/NACK in the MPDCCH transmission starting at a time $t_7$. However, the PDSCH reception that has started at time $t_6$ has not ended yet and this PDSCH transmission is sent in a different narrowband to that of the DCI. In other words, at $t_7$, two downlink transmissions are being sent to the terminal on two different narrowbands such that the terminal cannot receive both and will be unable to receive one of the two transmissions. Hence a collision of a PDSCH transmission and of a HARQ ACK/NACK transmission has occurred. It is noteworthy that the same problems apply even in cases where the HARQ message is not transmitted by a DCI, but is transmitted in any other suitable manner. So long as it is transmitted on a different narrowband than that of the downlink message received from the base station (e.g. on the PDSCH), a collision can occur and the terminal may not receive some of the messages intended for it.

In accordance with the present disclosure there is provided an arrangement where in the event that a collision between a downlink transmission to the terminal in a first frequency band and an acknowledgment transmission to the terminal in a second frequency band is detected, the downlink signal and the acknowledgment transmissions are multiplexed and transmitted in one of the first and second frequency band, for example the first frequency band.

Figure 3:
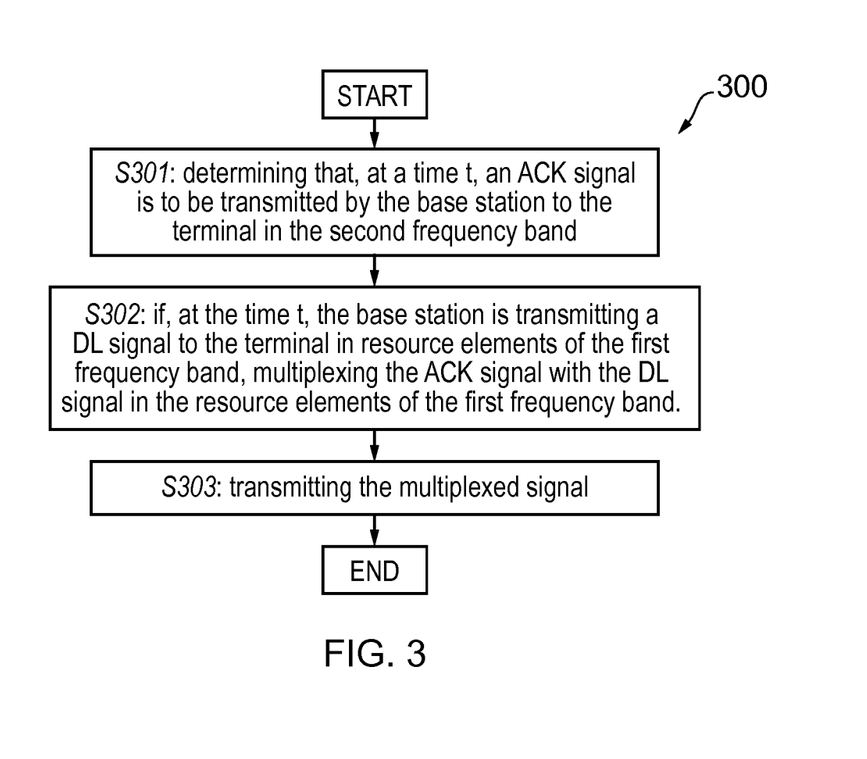
FIG. 3 illustrates an example method in accordance with the present disclosure.

FIG. 3 illustrates an example method in accordance with the present disclosure. The method 300 is used in a system where a base station and a terminal can communicate using at least two different frequency bands, a first frequency band and second frequency band. The method 300 starts and at S301, it is determined that, at a time t, an acknowledgement signal is to be transmitted by the base station to the terminal in the second frequency band. An acknowledgment signal may sometimes also referred to as an ACK or ack signal, it should be noted that this ack signal can send an ACK or a NACK, that is a positive or a negative acknowledgment, respectively, may be carried by the ack signal) Then, at S302, if at time t, the base station will also be transmitting a downlink ("DL") signal to the terminal, the signal being in resource elements of the first frequency band a collision is detected between the ack and DL signals at time t. In this case, the method involves multiplexing the ack signal with the dl signal in the resource elements of the first frequency band, and transmitting the multiplexed signal (S303) using the resource elements of the first frequency band. Accordingly, the terminal may then be able to receive both the DL signal and the ack signal as these signals have been multiplexed and transmitted in the same frequency band. For example, with a narrowband LC-MTC terminal, the terminal can receive signals from the first frequency band only and, by de-multiplexing the received signal, it can extract the ack signal and the DL signal.

Figure 4:
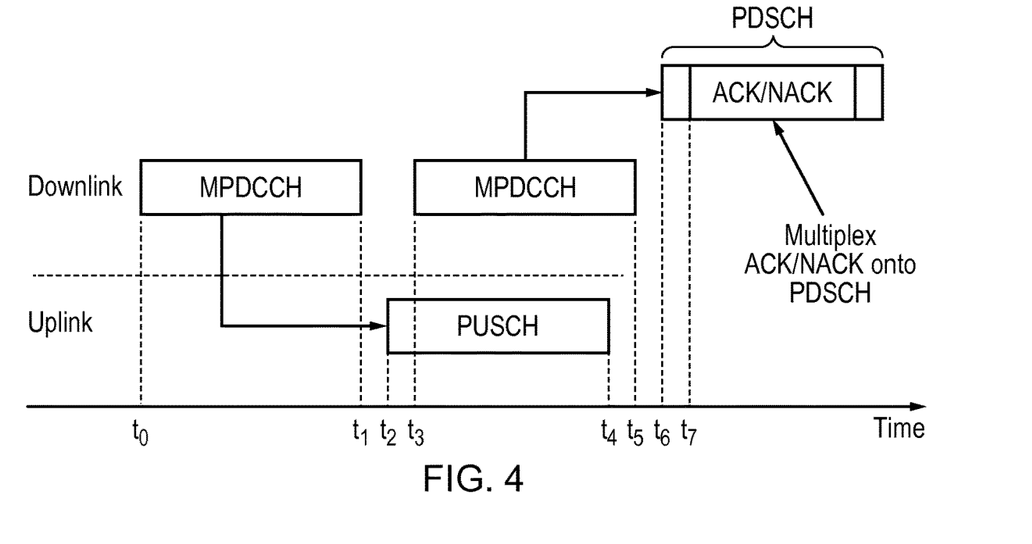
FIG. 4 is schematic illustration of the application of the method of FIG. 3 to the situation illustrated in FIG. 2.

FIG. 4 is a schematic illustration of the application of the method of FIG. 3 to the situation illustrated in FIG. 2. As for FIG. 2, the terminal receives an uplink grant for a PUSCH transmission (from the terminal) and later receives a downlink grant for a PDSCH transmission (from the base station) which will conflict in time with acknowledgement transmission (from the base station as well) corresponding to the previous PUSCH transmission. In accordance with the present disclosure, the PDSCH transmission and the ack transmission can be multiplexed, in this example onto the PDSCH, such that the terminal can then receive the multiplexed signal comprising both signals where it would otherwise be only able to receive only one of the two signals.

More specifically, in an LTE LC-MTC environment, the PDSCH and the HARQ ACK/NACK are multiplexed within a narrowband so that the LC-MTC terminal can read both the PDSCH and the HARQ ACK/NACK. This narrowband is indicated to the LC-MTC in the DCI (in the MPDCCH) used to schedule the PDSCH such that the LC-MTC terminal will monitor the narrowband containing the PDSCH. In the scenario where frequency hopping is used, then the narrowband containing PDSCH would refers to the narrowbands in which this PDSCH repetition occurs and the teachings of the present application apply equally to this situation. As the transmission for the DCI DL grant is likely to start before it is known whether a HARQ ACK/NACK will be transmitted, the terminal will monitor this narrowband rather than that used for the HARQ ACK/NACK.

Figure 5:
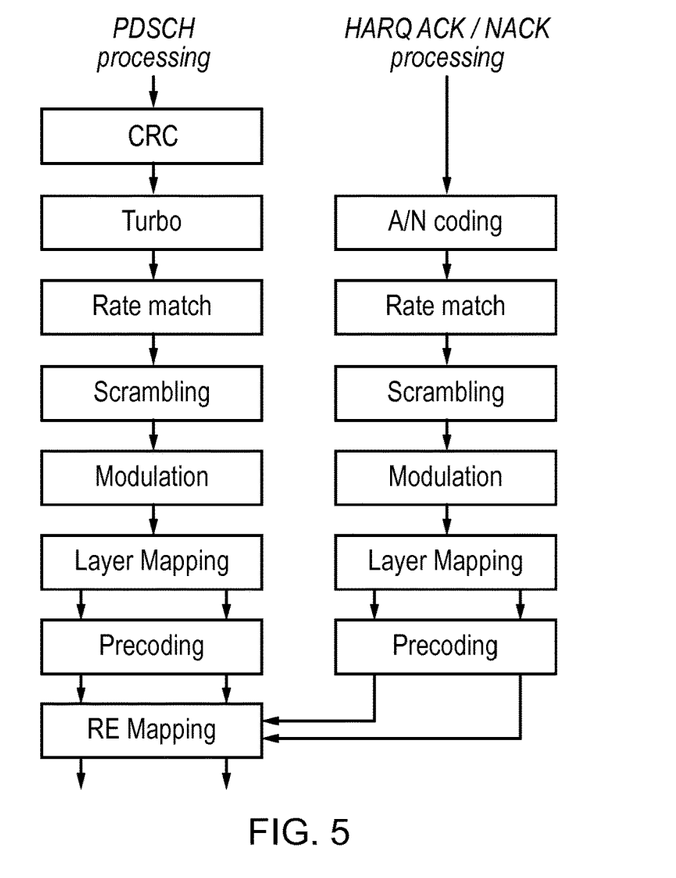
FIG. 5 illustrates an example signal processing for multiplexing signals.

The multiplexing can be carried out in a variety of ways, some of which will be discussed below. In an embodiment, the multiplexing is performed at the Resource Element (RE) level. FIG. 5 illustrates an example of multiplexing signals at the resource element level. Essentially resource elements are being generated for both signals to be multiplexed and the base station (that is, the element transmitting the multiplexed signal) will then, for each RE to be used for the terminal on the DL signal, insert either one RE from the PDSCH processing chain or one RE from the HARQ ACK/NACK processing chain. In effect, the HARQ ACK/NACK signal will then occupy some of the RE in the PRBs carrying the PDSCH. The multiplexing scheme to be used to select the location of the REs carrying the ACK/NACK and the REs carrying the PDSCH can be predefined (for example in accordance with a standard), may be signalled to the terminal (e.g. via terminal-specific RRC signalling or via system information) or may include a combination of both (e.g. different modes or schemes may be predefined and the base station may indicate which mode it is using). The starting and ending subframes, or OFDM symbols, where HARQ ACK/NACK REs are present (e.g. when the multiplexing starts) can be known to the LC-MTC terminal and/or can be predefined in the terminal. For example, as illustrated in FIG. 4, the part of the signal sent on the PDSCH narrowband that actually contains a multiplexed signal may not extend across the entire duration of the narrowband resources allocated for the PDSCH. The multiplexed portion of the signal, if it does not coincide fully with the PDSCH portion, may only start at a later time and/or finish before the PDSCH resources, if appropriate, and the terminal may then determine these times, for example based on one or more of: an expected acknowledgment signal transmission time, a multiplexing scheme, a pre-configured parameter, a signalled parameter, etc.

Returning to the example of FIG. 5, in this situation the layer mapping and precoding stages for the HARQ ACK/NACK bit stream can be independent to that applied to the PDSCH modulation symbols. For example, the HARQ ACK/NACK modulation symbols could have an Alamouti-based Space Frequency Block Code (SFBC)—such as an LTE transmission mode 2 transmit diversity scheme—applied to them whereas the PDSCH modulation symbols could be beamformed. In some examples, a configuration for one or more of the stages upstream of the RE mapping may be intentionally or unintentionally be the same or different for the processing of the PDSCH signal and of the acknowledgment signal.

In some examples, the locations of the acknowledgement REs may be a function of the cell ID and/or the terminal ID. This could be done with a view to reducing intercell interferences on the ACK/NACK bits, as these bits are more sensitive to transmission errors than PDSCH bits which can be more easily corrected using a Turbo code than acknowledgement signal bits which are generally not transmitted with the same sophistication of error correcting code. As the resource elements now used for transmitting the acknowledgement signal (multiplexed with the DL signal) have been allocated originally for a DL transmission, they may have been allocated in a frequency band that is more likely to experience intercell interference than a frequency band that would otherwise normally be allocated for acknowledgment signal transmissions. This can be partially alleviated by selecting, amongst the REs allocated for the DL signals, REs within the frequency band that are less likely to be affected by intercell interferences than others, if possible. For examples, resource elements that may be used for carrying HARQ ACK/NACK symbols could be selected based on any one or more of the following preferences or configurations:

Resource elements which are closer or relatively closer to the cell specific reference signals in the physical resource blocks than REs for PDSCH transmission; and/or Resource elements in the first (e.g. OFDM) symbol of the resources available to the terminal. For example, for an LTE MTC device, if the legacy control channel region occupies OFDM symbols 0 and 1, the acknowledgment signal could be mapped to resource elements in OFDM symbol 2.

Resource elements that occupy known locations in the lowest PRB(s) or PRB-pair(s) allocated to the terminal. For example, in a case where a terminal has been allocated PRB-pairs 0, 1 and 2 for a narrowband of 6 PRBs, the HARQ ACK/NACK can then for example only occupy resource elements in PRB pair 0.

Figure 6:
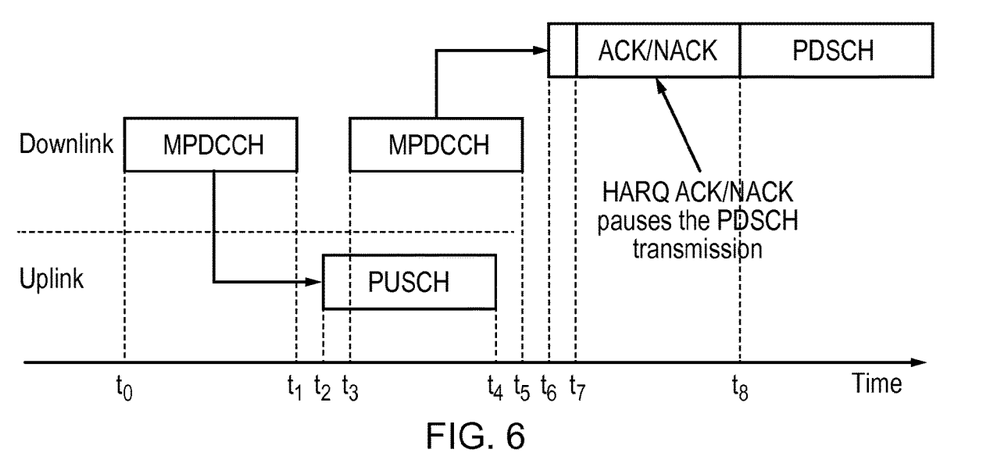
FIG. 6 schematically illustrates an example multiplexing scheme.
Figure 7:
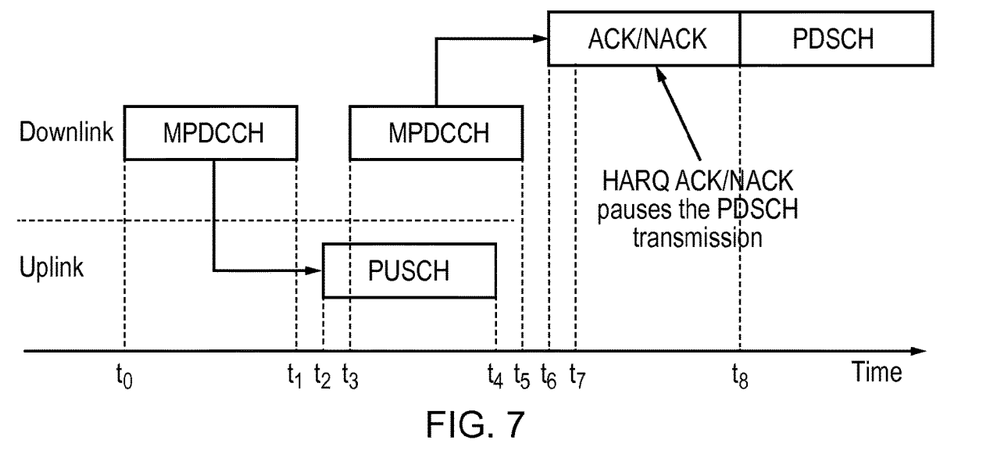
FIG. 7 schematically illustrates another example multiplexing scheme.

Any other suitable RE selection criterion may be used, either on its own or in combination with others. In one example, the multiplexing is based on a scheme wherein the acknowledgment signal occupies all the REs allocated for the PDSCH until it has been transmitted. In effect, the transmission of the DL signal on the PDSCH is paused until the transmission of the acknowledgment signal (with repetition, if appropriate) is complete. FIG. 6 schematically illustrates an example multiplexing based on a pausing of the downlink signal. Again, this example is given in the context of an LTE LC-MTC terminal but the same teachings apply to other environments as well. The first messages are similar to those illustrated in FIGS. 2 and 4 such that their description will not be repeated again here. Then, at time $t_6$, the PDSCH reception begins but at time $t_7$, the acknowledgment message for the previous PUSCH transmission is expected. In this example, at time $t_7$ the transmission of the PDSCH is temporarily paused and the ack signal transmission begins. When the HARQ ACK/NACK signal transmission is completed (time $t_8$), the PDSCH transmission can then resume. In this example, if CE is implemented, the terminal can accumulate ack signal repeated transmissions and then once this has been done, can resume the accumulation of the PDSCH accumulation rather than actively carry out the accumulation in parallel. Also, on a case where the ack signal transmission starts before the PDSCH transmission, this can allow the terminal (that has already started accumulating repetitive samples of the ack signal using symbol combining) to continue to do so without interrupting its symbol combining process and to then switch over to the PDSCH transmission. This is illustrated with reference to FIG. 7 where the ack signal would normally be expected at time $t_6$ and the PDSCH at time $t_7$. The ack signal transmission starts at time $t_6$ in the PDSCH narrowband, then at time $t_7$, rather than starting the transmission of the PDSCH, the base station pauses this transmission until the ACK/NACK transmission is completed at $t_8$. Accordingly the multiplexing is then provided by transmitting the ack signal first and delaying the PDSCH and by then transmitting the PDSCH.

Figure 8:
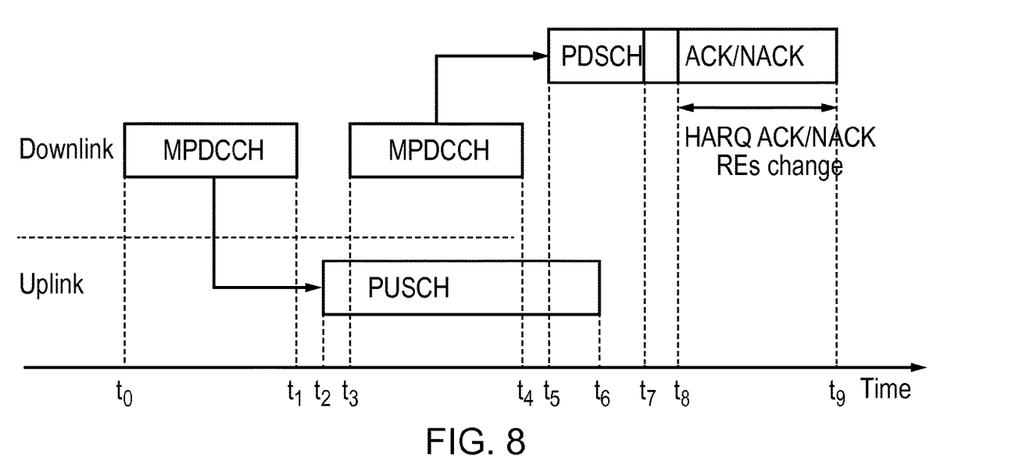
FIG. 8 schematically illustrates a further example multiplexing scheme.

In another embodiment where CE is implemented for the terminal, the density of REs containing ack signal in the REs allocated to the terminal (originally for the PDSCH transmission only) can be adjusted after a certain number of repetitions. That is, the locations and number of the REs containing HARQ ACK/NACK (e.g. the multiplexing scheme or multiplexing scheme's configuration) can change during the multiplexing of DL (PDSCH) and ack (HARQ ACK/NACK) signals. This may be particularly useful for example in cases where the PDSCH repetitions end before the ack signal repetitions, or the other way around. For example, in FIG. 8, the PDSCH repetition starts at $t_5$ and ends at $t_8$ whilst the repetition of the HARQ ACK/NACK starts at time $t_7$ but ends at $t_9$ where $t_9 > t_8$. Once the PDSCH repetitions have ended, the downlink resource can be entirely used for transmitting the HARQ ACK/NACK. By increasing the density of the HARQ ACK/NACK, this can enable a faster completion of the HARQ ACK/NACK transmissions to the terminal. In another example, the ack signal first may be prioritised in the multiplexing, with for example 60% or more of the REs being allocated to it and, once a certain number of repetitions for the ack signal has been reached, the number of REs allocated to the ack signal can be reduced. For example, if the ack signal is to be repeated n times, the multiplexing may be arranged such that, once n/2 repetitions have been carried out, the ratio of REs allocated to the ack signal relative to the total REs can be dropped from 60% or more to a lower second value, for example 40% or less for the remainder of the transmission of the ack and PDSCH signals. Other implementations may be provided wherein the relative weight of the ack and PDSCH in the multiplexing of the signals can be varied with time. Accordingly, the respective relative ratio of the ack and DL signals in the multiplexed signal can be varied from 0% to 100% —or any other suitable range within [0%-100%]— based on time and on any other parameters during the transmission of the multiplexed signal.

Figure 9:
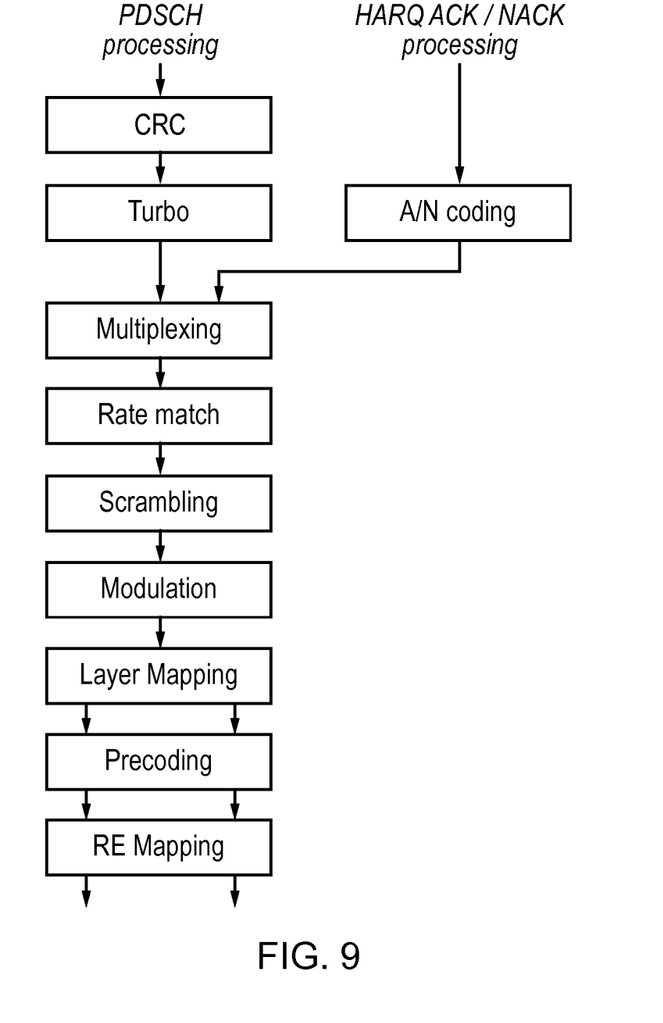
FIG. 9 illustrates another example signal processing for multiplexing signals.

Aside from deciding how to multiplex the two signals in terms of how to prioritise them, whether to pause one to transmit the other, which relative ratios to use, etc. the multiplexing scheme can be applied at different stages. As previously discussed with respect to FIG. 5, the multiplexing can be applied at the RE mapping stage. FIG. 9 illustrates an example of multiplexing signals at the rate matching stage (after the turbo-coding stage). FIG. 9 shows the transport channel processing chain for the HARQ ACK/NACK being multiplexed with the PDSCH at the rate matching level. In this example, the DL signal is error-control-coded using a Turbo code, while the ack signal error-control-coded using a HARQ ACK/NACK coding function ("A/N coding"). A potential coding algorithm to apply to the ACK/NACK bit in the A/N coding function would be repetition coding, for example the amount of repetition coding applied could be determined to ensure that the block error rate for the ACK/NACK bits is appropriately scaled relative to the BLock Error Rate (BLER) of the PDSCH. It is noteworthy that in other examples, either or both signal processing chains can use any other appropriate error-control-coded schemes. The coded bit streams for the DL signal and the ack signal are then multiplexed into a single combined bit stream which is rate-matched using a single rate matching algorithm. From one perspective, the rate matching algorithm interleaves the input bit streams and either punctures or repeats bits of the input stream such that the number of bits at the output of the rate matcher is compatible with the number of available resource elements. The multiplexed signal can then carry on downstream through the usual stages, e.g. for the two signals to be modulated together (e.g. to QPSK or 16QAM symbols), etc. until the bits are mapped to resource elements and transmitted over the air. In this example, by multiplexing the signals at this level, this can have the benefit of adjusting the redundancy and/or resilience of the acknowledgment information stream in unison with that of the downlink information stream. The specific resource elements that the ack signal is mapped to later on do not need to be specified in detail as the ack signal bits will be automatically mapped to resource element positions via the known rate matching function and the next stages. By multiplexing the signals at a higher level in the signal processing stream, the terminal can be simplified as it may not have to process to signals in parallel until a later stage is reached, potentially until the last stage (cf. FIG. 5) while on the other hand, the two signals will be processed in the same manner and the terminal will have less flexibility with processing the two signals differently depending for example on different needs, preferences or configuration for each signal.

Figure 10:
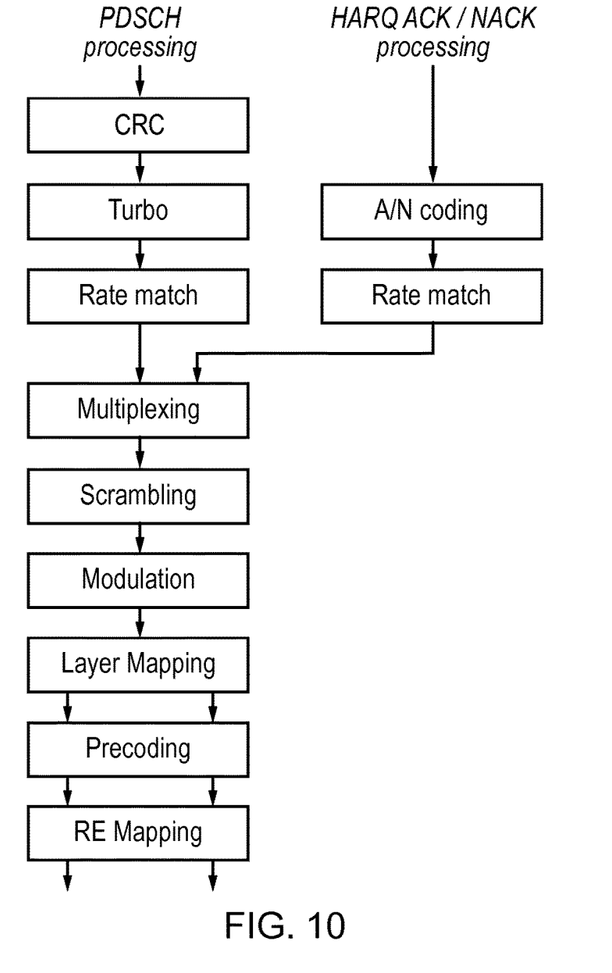
FIG. 10 illustrates a further example signal processing for multiplexing signals.

FIG. 10 illustrates an example of multiplexing signals at the scrambling stage (after the rate-matching stage). In this example the transport channel processing chain where the HARQ ACK/NACK coded bit stream is multiplexed with the PDSCH coded bit stream after the PDSCH and HARQ ACK/NACK bits have been separately rate matched. Separately rate matching the two coded bit streams can assist with allowing the reliability of the HARQ ACK/NACK bit to be adjusted independently of the reliability of the PDSCH (for example to achieve different BLER targets for the PDSCH and the HARQ ACK/NACK bits). In this example, the multiplexing scheme may also include an interleaving function, for example with a view to avoiding the HARQ ACK/NACK coded bit stream being mapped to a localised (in the time/frequency resource grid) region of the resource grid.

In another example, the multiplexing of the signals could alternatively be carried out after the "modulation" stage (before the layer mapping stage). This could for example allow the ack signal bit stream to be modulated with a different modulation scheme to that of the DL signal. In some examples, HARQ ACK/NACK bits could be modulated using a QPSK modulation and PDSCH bits could be modulated using a 16QAM modulation. This could further allow the system to balance the reliability of the ack signal bit stream to the reliability of the PDSCH bit stream.

In a further example, the ack signal and DL signal can occupy different PRBs within the narrowband, or more generally different frequency sub-bands within the narrow band. From one perspective, this can be seen as transmitting two separate channels within the narrowband, one for the ack signal and another one for the DL signal. The ack signal can be for example in the form or format similar or identical to that of ePHICH or DCI carried by MPDCCH, as appropriate, which may simplify the implementation on the terminal side and limit the number of modifications to be made to the overall system and its specifications to accommodate this proposed multiplexed signal. The terminal would then need to decode two channels within the narrowband. However, this method may also result in higher overhead, because of overheads for the ack signal and for the PDSCH, which may lead to longer repetitions. This method, if applied for the entire length of the transmission to the terminal could also reduce the number of frequency resources available for downlink signals other than ack signals, for example for PDSCH transmissions, as some of these resources will be reserved for the HARQ ACK/NACK.

In yet another example, the multiplexing can be performed at the MAC level, prior to the CRC stage. In this case, the ack and the downlink shared channel (DL-SCH) transport blocks are multiplexed into a single message and transmitted to the UE as a single PDSCH. However, for this to occur, the base station may have to be aware of the entire contents to be transmitted in the multiplexed signal before the PDSCH is transmitted. The terminal would then separate the message at the MAC level to extract each individual signal. If for example the base station is aware that an ack or nack response will be transmitted in response to the previous PUSCH transmission, then this multiplexing can be carried out at the MAC layer. In other cases, for example when the base station starts transmitting the DL signal before determining that an ack signal is also to be sent at the same time, the multiplexing will generally be carried out at a lower (PHY) layer.

In another example, the multiplexing may be performed at the CRC level, whereby the CRC is masked by a bit field that corresponds to the ACK/NACK information. For example the CRC may be masked by either (1) a string of '1' bits to represent an ACK, (2) a string of '0' bits to indicate a NACK, or (3)_an alternating sequence of '0' and '1' bits to indicate that no PUSCH-related ACK/NACK is multiplexed with the PDSCH. At the receiver, the UE can blind decode the PDSCH according to hypotheses of (1) ACK of PUSCH, (2) NACK of PUSCH or (3) no PUSCH transmitted.

For the de-multiplexing at the terminal, the terminal would then use a de-multiplexing scheme that corresponds or mirrors the multiplexing scheme and apply the de-multiplexing scheme at the relevant stage. For example, with the situation illustrated in FIG. 9, which relates to the transmitted (base station) side, the receiver (terminal) would decode the signal using a corresponding signal processing stream and, once it has reached and carried out the reverse rate-matching stage, it would de-multiplex the ack and DL signals based on the multiplex/de-multiplex information. The two signals would then be processed separately, with the DL signal going through the reverse turbo-coding and CRC stages and the ack signal going through the reverse A/N coding stage. With the example of FIG. 10, the two signals would be processed together up to the reverse-scrambling stage and then the reverse rate-matching stages and any upstream stages would be carried out separately for each signal.

In some cases, there is a possibility that the terminal fails to receive the DCI message on the MPDCCH containing the uplink grant for the PUSCH and, depending on how the terminal detects whether the signal sent on the PDSCH is a multiplexed signal or not, the terminal may not be aware that an uplink HARQ ACK/NACK is being multiplexed with the DL signal into the PDSCH narrowband. This could potentially degrade the downlink transmissions for the terminal. For example, this would generally be expected to degrade the repetition accumulation process at the terminal since the subframes containing HARQ ACK/NACK REs can be different to those that contain only PDSCH REs (depending on the level at which the multiplexing is being carried out). Therefore, while an automatic detection of multiplexed signals carried out by the terminal (e.g. based on whether an acknowledgement signal is expected or not) can provide a relatively simple detection scheme with a low overhead, it can also be beneficial, alternatively or additionally, to include an explicit indication from the base station that the signal transmitted in the narrowband includes a multiplexed signal (and/or indicate multiplexing scheme information, for assisting the terminal with the de-multiplexing). For example, in LTE, the DCI carrying the downlink grant (that schedules the PDSCH) may indicate whether the PDSCH contains multiplexed HARQ ACK/NACK, or a different DCI format may be used to allocate the PDSCH.

Now turning to the allocation of resources on the narrowband, it is expected that when the base station allocates the DL resources on the PDSCH for the terminal, it is already aware that the transmission of an ack message will be expected at a certain time, based on the previous allocation of UL resources to the terminal. For example, the base station would generally be aware of the starting and ending times of the uplink transmission, as it has allocated the resources for it, and may then be able to derive the expected time for transmitting an ack or nack to the terminal. In some example, this would be at the sub-frame n+k with k=4 (see discussion above) with n being the last sub-frame of the uplink transmission. Accordingly, the base station would then be aware, at the time of allocating the resources for the PDSCH, that an ack signal is expected to be multiplexed into the PDSCH and can therefore allocate resources based on the resources needed for the PDSCH transmission and the ack signal transmission. In some cases, it may also take into account any additional resources that may be required due to the use of a multiplexed signal as proposed in the present disclosure. Accordingly, the base station can allocate a number of resource elements in a single narrowband that is sufficient for sending at least the multiplexed signal made by multiplexing the downlink signal and the acknowledgment signal. In other examples, even if the number of resource elements allocated in the narrowband may not be sufficient to transmit the full DL and ack signals, arrangements can be made to send the multiplexed signal using these resources. For example, if the DL and ack signals are to be repeated a number of times N1 and N2, respectively, the multiplexed signal can be made by multiplexing the DL and ack signals repeated a number of times N'1 and N'2, respectively, with N'1<N1 and/or N'2<N2. While each signal will repeated fewer times, such that the coverage extension will not use its full capacity, fewer resources elements are required for sending the multiplexed signal than if keeping the original numbers of repetition such that the multiplexed signal may be fitted into the resources allocated for the DL signal only. It is also noteworthy that acknowledgement signals are generally expected to be relatively small messages, as they are intended to carry information that can be encoded on 1 bit only, the number of repetitions for the downlink signal may only be slightly reduced to accommodate the repeated ack signal in the allocated resources.

As the skilled person would have understood from the present disclosure, while the terminal may implement a CE scheme with repetition being implemented (which would be likely for example for an LC-MTC terminal), the teachings of the present application are also applicable to a case where the transmissions to the terminal are not repeated.

Figure 11:
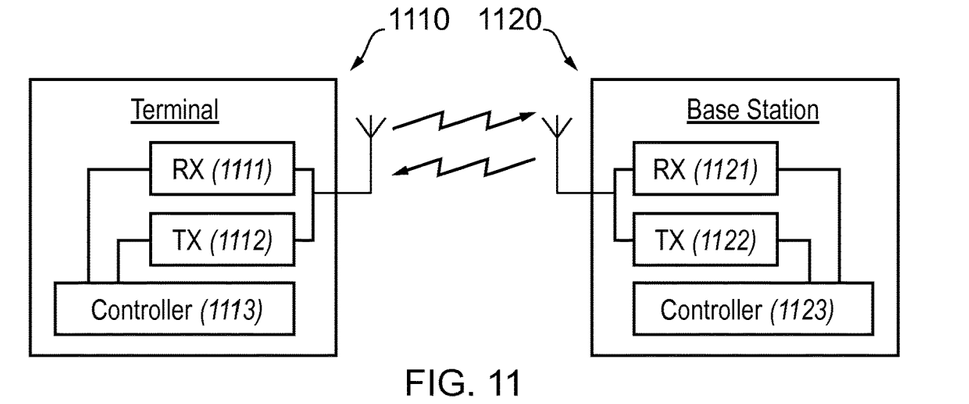
FIG. 11 illustrates an example terminal and an example base station in a telecommunications system.

FIG. 11 illustrates an example terminal (1110) and an example base station (1120) configured to communicate with each other and which may implement one or more techniques as discussed herein. The terminal 1110 comprises a receiver 1111 and a transmitter 1112 connected to an antenna for communicating via a wireless interface. The terminal also comprises a controller 1113 for controlling at least the receiver and transmitter of the terminal 1110. For example, the controller, receiver and transmitter may be configured to operate together to receive, in a single bandwidth, a multiplexed signal comprising a DL signal and an ack signal and to de-multiplex the multiplexed signal to extract each of the DL and ack signals. Likewise, the base station 1120 comprises a receiver 1121 and a transmitter 1122 connected to an antenna for communicating via a wireless interface. The base station 1120 also comprises a controller 1123 for controlling at least the receiver and transmitter of the base station 1120. For example, the controller, receiver and transmitter may be configured to operate together to transmit, when a conflict is detected between an ack signal to be sent on a bandwidth and a DL signal to be sent on a different bandwidth is detected, a multiplexed signal which multiplexes the ack and the DL signal, wherein the multiplexed signal is transmitted on a single bandwidth. The base station and terminal can communicate over the air, via the wireless interface by transmitting uplink signals from the terminal to the base station and downlink signals from the base station to the terminal.

While FIG. 11 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 11 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

There has therefore been described an arrangement where an acknowledgement signal can be transmitted to the terminal, despite a time overlap between the acknowledgement and downlink signals, without necessarily having to adjust the starting time of the acknowledgment signal or of the downlink signal. In other cases, the acknowledgment signal would either not be read, which would result in a retransmission of the uplink signal it relates to, or it would have to be delayed, for example until after the end of the PDSCH transmission. However, the first option would reduce the efficiency of the system while the second one would disrupt the timing of the uplink and acknowledgment signals transmissions such that this could disrupt the communications and/or require significant changes to the defined timings of acknowledgment messages.

In accordance with one example of the present disclosure, there is provided a method of transmitting an acknowledgment signal in a mobile telecommunications system, the system comprising a base station and a terminal operable to communicate with the base station via a wireless interface, the wireless interface having a first frequency band and a second frequency band, wherein the first frequency band is different from the second frequency band. The method comprises: determining that, at a time t, an acknowledgment signal is to be transmitted by the base station to the terminal in the second frequency band; if it is determined that, at the time t, a downlink signal is to be transmitted to the terminal, wherein the downlink signal is to be transmitted to the terminal in one or more resource elements of the first frequency band, then transmitting a multiplexed signal by multiplexing the acknowledgment signal with the downlink signal and transmitting the multiplexed signal in the one or more resource elements of the first frequency band. It is noteworthy that when it is determined that at time t a downlink signal is to be transmitted, the transmission of the downlink signal may have started earlier than time t, or may start at time t. Likewise, when it is determined that at time t an acknowledgment signal is to be transmitted, the transmission of the acknowledgment signal may have started earlier than time t, or may start at time t. The significance of time t is that, at the same time, both an ack and DL signal are to be transmitted to the terminal in two different frequency bands and rather than transmitting the signals in their respective bands, the two signals are multiplexed and the multiplexed signal is transmitted in one of the bands.

While the present disclosure has generally been discussed in a context where a PDSCH is multiplexed with an acknowledgement signal, any other types of downlink signals, for example any downlink signals carrying user data, control signalling, etc. may be multiplexed with the acknowledgment signal. It should therefore be understood that the teachings of the present disclosure apply to the multiplexing of an acknowledgment signal with any other downlink signal whose timing may conflict with the timing of the acknowledgment signal.

Also, while generally in the above examples the multiplexed signal is generally transmitted on the narrowband for the downlink signal to be multiplexed with the acknowledgment signal, not for the acknowledgment signal, in other examples it could be transmitted on the narrowband for the acknowledgement signal. It is however noteworthy that, in practice, it may be found that it could be more efficient to use the downlink signal (e.g. PDSCH) narrowband/bandwidth, for example depending on the frequency resource distribution for the different types of signals. For example, in some 3GPP systems, the resources used for HARQ ACK/NACK transmissions are generally shared by multiple LC-MTC terminals such that transmitting a downlink signal on the narrowband generally used for acknowledgement signals can significantly (by transmitting a multiplexed signal comprising the downlink signal) reduce the number of resources that remain available for other terminals to receive acknowledgement signals and, depending on the timing of the various signals, the downlink signal transmission may thus interfere with acknowledgement transmission (and thus also reception) by other terminals.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered (for example a single MAC message may correspond to a plurality of REs). Also, transmissions from one terminal to a base station may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more or a mobile terminal (e.g. a D2D terminal), a relay node (e.g. a terminal-to-terminal relay node), a base station or any other mobile node may be configured accordingly if appropriate, so long as it is technically feasible.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or LC-MTC, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method of transmitting an acknowledgment signal in a mobile telecommunications system, the system comprising a base station and a terminal operable to communicate with the base station via a wireless interface, the wireless interface having a first frequency band and a second frequency band, wherein the first frequency band is different from the second frequency band and the method comprises:

determining that, at a time t, an acknowledgment signal is to be transmitted by the base station to the terminal in the second frequency band;

if it is determined that, at the time t, a downlink signal is to be transmitted to the terminal, wherein the downlink signal is to be transmitted to the terminal in a first frequency band, then transmitting a multiplexed signal by multiplexing the acknowledgment signal with the downlink signal and transmitting the multiplexed signal in the first frequency band.

Clause 2. The method of clause 1 further comprising:

if, at the time t, a downlink signal is not to be transmitted to the terminal in the first frequency band, then transmitting the acknowledgment signal in the second frequency band.

Clause 3. The method of any preceding clause wherein the terminal is operable to receive signals transmitted in a frequency band having a bandwidth that does not exceed a bandwidth threshold and wherein the first and the second frequency bands together spread across a combined bandwidth larger than the bandwidth threshold.

Clause 4. The method of any preceding clause, wherein the downlink signal is transmitted using a repetition scheme for repeating one or more downlink signal symbols a plurality of times within the downlink signal for increasing the total received power for the one or more downlink signal symbols.

Clause 5. The method of any preceding clause, wherein the acknowledgment signal is transmitted using a repetition scheme for repeating one or more acknowledgment signal symbols a plurality of times within the acknowledgment signal for increasing the total received power for the one or more downlink signal symbols.

Clause 6. The method of any preceding clause further comprising:

detecting that the signal received by the terminal in the first frequency band is a multiplexed signal; and de-multiplexing the received signal to extract the downlink signal and the acknowledgment signal.

Clause 7. The method of clause 6 wherein the detecting is based on one or more of:

receiving an indication that the signal transmitted in the first frequency band is a multiplexed signal; and identifying that an acknowledgment signal is expected by the terminal at time t' and that the terminal is receiving, at time t', a downlink signal in the first frequency band.

Clause 8. The method of clause 6 or 7, wherein the de-multiplexing is based on one or more of: receiving multiplexing information for identifying a de-multiplexing scheme; and one or more parameters configured in the base station.

Clause 9. The method of clause 8, wherein the multiplexing information is for identifying a de-multiplexing scheme for one or more of:

the multiplexed signal only;

the multiplexed signal and a further multiplexed signal generated by multiplexing a further downlink signal and a further acknowledgment signal, the further multiplexed signal being transmitted by the base station.

Clause 10. The method of any preceding clause further comprising:

transmitting, before time t and by the base station, a control signal to the terminal via a third frequency band;

wherein the control signal comprises one or more of:

an indication that a multiplexing scheme has been applied to the multiplexed signal transmitted in the first frequency band; and an indication of a multiplexing scheme applied to the multiplexed signal.

Clause 11. The method of clause 10 wherein the third frequency band is the same as the first frequency band, the same as the second frequency band or different from the first and second frequency bands.

Clause 12. The method of any preceding clause wherein the multiplexing of the acknowledgment signal with the downlink signal comprises:

from time t, pausing the transmission of the downlink signal and transmitting the acknowledgment signal in the first frequency band;

once the acknowledgement signal has been transmitted, resuming the transmission of the downlink signal in the first frequency band.

Clause 13. The method of any one of preceding clauses 1 to 11 wherein the multiplexing of the acknowledgment signal with the downlink signal comprises:

transmitting the downlink signal in resources elements in a first frequency sub-band of the first frequency band;

transmitting the acknowledgment signal in resource elements in a second frequency sub-band of the first frequency band, wherein the second frequency sub-band is separate from the first frequency sub-band.

Clause 14. The method of any preceding clause wherein the multiplexing of the acknowledgment signal with the downlink signal comprises one or more of:

multiplexing the acknowledgment signal with the downlink signal at a resource element mapping level; multiplexing the acknowledgment signal with the downlink signal prior to a rate matching stage;

multiplexing the acknowledgment signal with the downlink signal after a turbo coding stage;

multiplexing the acknowledgment signal with the downlink signal prior to a scrambling stage;

multiplexing the acknowledgment signal with the downlink signal after a rate matching stage;

multiplexing the acknowledgment signal with the downlink signal prior to a Cyclic Redundancy Check "CRC" stage; and multiplexing the acknowledgment signal with the downlink signal at a "CRC" stage wherein the CRC for the downlink signal is masked by a mask which is dependent on the acknowledgment signal carrying a positive or a negative acknowledgment.

Clause 15. A method of transmitting an acknowledgement signal in a mobile telecommunications system, the system comprising a base station and a terminal operable to communicate with the base station via a wireless interface and the method comprising:

determining that, at a time t, an acknowledgment signal is to be transmitted by the base station to the terminal;

unless the base station is transmitting a downlink signal to the terminal at the time t and in a first frequency band, transmitting the acknowledgement signal in a second frequency band different from the first frequency band;

if the base station is transmitting a downlink signal to the terminal at the time t and in a first frequency band, transmitting a multiplexed signal by multiplexing the acknowledgment signal with the downlink signal in the first frequency band.

Clause 16. A base station for use in a mobile telecommunications system, the system comprising the base station and a terminal operable to communicate with the base station via a wireless interface, the wireless interface having a first frequency band and a second frequency band, wherein the first frequency band is different from the second frequency band and the base station comprises a transmitter, a receiver and a controller, the controller being configured to:

determine that, at a time t, an acknowledgment signal is to be transmitted by the base station to the terminal in the second frequency band;

transmit, via the transmitter and upon determination that at the time t a downlink signal is to be transmitted to the terminal in the first frequency band, a multiplexed signal by multiplexing the acknowledgment signal with the downlink signal and transmitting the multiplexed signal in the first frequency band.

Clause 17. Circuitry for a base station for use in a mobile telecommunications system, the system comprising the base station and a terminal operable to communicate with the base station via a wireless interface, the wireless interface having a first frequency band and a second frequency band, wherein the first frequency band is different from the second frequency band and wherein the circuitry comprises a controller element and a transceiver element configured to operate together to:

determine that, at a time t, an acknowledgment signal is to be transmitted by the base station to the terminal in the second frequency band;

transmit, upon determination that at the time t a downlink signal is to be transmitted to the terminal in the first frequency band, a multiplexed signal by multiplexing the acknowledgment signal with the downlink signal and transmitting the multiplexed signal in the first frequency band.

Clause 18. A method of operating a base station in a mobile telecommunications system, the system comprising the base station and a terminal operable to communicate with the base station via a wireless interface, the wireless interface having a first frequency band and a second frequency band, wherein the first frequency band is different from the second frequency band and the method comprises:

determining that, at a time t, an acknowledgment signal is to be transmitted by the base station to the terminal in the second frequency band;

transmitting, upon determination that at the time t a downlink signal is to be transmitted to the terminal in the first frequency band, a multiplexed signal by multiplexing the acknowledgment signal with the downlink signal and transmitting the multiplexed signal in the first frequency band.

Clause 19. A terminal for use in a mobile telecommunications system, the system comprising a base station and the terminal operable to communicate with the base station via a wireless interface, wherein the terminal comprises a transmitter, a receiver and a controller, the controller being configured to: receive via the receiver a first signal in a first frequency band;

detect that the received signal is a multiplexed signal multiplexing a downlink signal with an acknowledgment signal; and de-multiplex the received signal to extract the downlink signal and the acknowledgment signal.

Clause 20. Circuitry for a terminal for use in a mobile telecommunications system, the system comprising a base station and the terminal operable to communicate with the base station via a wireless interface, wherein the circuitry comprises a controller element and a transceiver element configured to operate together to:

receive a first signal in a first frequency band;

detect that the received signal is a multiplexed signal multiplexing a downlink signal with an acknowledgment signal; and de-multiplex the received signal to extract the downlink signal and the acknowledgment signal.

Clause 21. A method of operating a terminal in a mobile telecommunications system, the system comprising a base station and the terminal operable to communicate with the base station via a wireless interface, wherein the method comprises:

receiving a first signal in a first frequency band;

detecting that the received signal is a multiplexed signal multiplexing a downlink signal with an acknowledgment signal; and de-multiplexing the received signal to extract the downlink signal and the acknowledgment signal.

Clause 22. Computer software which, when executed by a computer, causes the computer to perform the method of any one of clause 1 to 14, 15, 18 and 21.

Clause 23. A storage medium which stores computer software according to clause 22.

Clause 24. A method of transmitting an acknowledgment signal, a base station, circuitry for a base station, a method of operating a base station, a terminal, circuitry for a terminal, a method of operating a terminal, computer software and/or a storage medium substantially as hereinbefore described with reference to the accompanying drawings Clause 25. Any preceding clause wherein the base station and the mobile communications devices are operable to communicate via the wireless interface using at least one of: a 3GPP communication protocol, an LTE communication protocol, a 4G communication protocol and a 5G communication protocol.

REFERENCES

[1] 3GPP TS 22.368 version 13.1.0 Release 13 (2014-12)
[2] Holma H. and Toskala A., "LTE for UMTS OFDMA and SC-FDMA based radio access", John Wiley and Sons, 2009

The invention claimed is:

1. A method of transmitting an acknowledgment signal in a mobile telecommunications system, the system comprising a base station and a terminal operable to communicate with the base station via a wireless interface, the wireless interface having a first frequency band and a second frequency band, wherein the first frequency band is different from the second frequency band and the method comprises:
   determining that, at a time t, an acknowledgment signal is to be transmitted by the base station to the terminal in the second frequency band;
   determining that, at the time t, a downlink signal is to be transmitted to the terminal to cause a collision between the acknowledgment signal and the downlink signal, wherein the downlink signal is to be transmitted to the terminal in a first frequency band; and
   in response to determination that, at the time t, the acknowledgment signal is to be transmitted and the downlink signal is to be transmitted to cause the collision, transmitting a multiplexed signal by multiplexing the acknowledgment signal with the downlink signal and transmitting the multiplexed signal in the first frequency band.

2. The method of claim 1 further comprising:
   if, at the time t, a downlink signal is not to be transmitted to the terminal in the first frequency band, then transmitting the acknowledgment signal in the second frequency band.

3. The method of claim 1 wherein the terminal is operable to receive signals transmitted in a frequency band having a bandwidth that does not exceed bandwidth threshold and wherein the first and the second frequency bands together spread across a combined bandwidth larger than the bandwidth threshold.

4. The method of claim 1, wherein the downlink signal is transmitted using a repetition scheme for repeating one or more downlink signal symbols a plurality of times within the downlink signal for increasing a total received power for the one or more downlink signal symbols.

5. The method of claim 1, wherein the acknowledgment signal is transmitted using a repetition scheme for repeating one or more acknowledgment signal symbols a plurality of times within the acknowledgment signal for increasing a total received power for the one or more downlink signal symbols.

6. The method of claim 1 further comprising:
   detecting that the signal received by the terminal in the first frequency band is a multiplexed signal; and
   de-multiplexing the received signal to extract the downlink signal and the acknowledgment signal.

7. The method of claim 6 wherein the detecting is based on one or more of:
   receiving an indication that the signal transmitted in the first frequency band is a multiplexed signal; and
   identifying that an acknowledgment signal is expected by the terminal at time t' and that the terminal is receiving, at time t', a downlink signal in the first frequency band.

8. The method of claim 6, wherein the de-multiplexing is based on one or more of:
   receiving multiplexing information for identifying a de-multiplexing scheme; and
   one or more parameters configured in the base station.

9. The method of claim 8, wherein the multiplexing information is for identifying a de-multiplexing scheme for one or more of:
   the multiplexed signal only;
   the multiplexed signal and a further multiplexed signal generated by multiplexing a further downlink signal and a further acknowledgment signal, the further multiplexed signal being transmitted by the base station.

10. The method of claim 1 further comprising:
    transmitting, before time t and by the base station, a control signal to the terminal via a third frequency band;
    wherein the control signal comprises one or more of:
    an indication that a multiplexing scheme has been applied to the multiplexed signal transmitted in the first frequency band; and
    an indication of a multiplexing scheme applied to the multiplexed signal.

11. The method of claim 10 wherein the third frequency band is the same as the first frequency band, the same as the second frequency band or different from the first and second frequency bands.

12. The method of claim 1 wherein the multiplexing of the acknowledgment signal with the downlink signal comprises:
    from time t, pausing the transmission of the downlink signal and transmitting the acknowledgment signal in the first frequency band;
    once the acknowledgement signal has been transmitted, resuming the transmission of the downlink signal in the first frequency band.

13. The method of claim 1 wherein the multiplexing of the acknowledgment signal with the downlink signal comprises:
    transmitting the downlink signal in resources elements in a first frequency sub-band of the first frequency band;
    transmitting the acknowledgment signal in resource elements in a second frequency sub-band of the first frequency band, wherein the second frequency sub-band is separate from the first frequency sub-band.

14. The method of claim 1 wherein the multiplexing of the acknowledgment signal with the downlink signal comprises one or more of:
    multiplexing the acknowledgment signal with the downlink signal at a resource element mapping level;
    multiplexing the acknowledgment signal with the downlink signal prior to a rate matching stage;
    multiplexing the acknowledgment signal with the downlink signal after a turbo coding stage;
    multiplexing the acknowledgment signal with the downlink signal prior to a scrambling stage;
    multiplexing the acknowledgment signal with the downlink signal after a rate matching stage;
    multiplexing the acknowledgment signal with the downlink signal prior to a Cyclic Redundancy Check "CRC" stage; and
    multiplexing the acknowledgment signal with the downlink signal at a "CRC" stage wherein the CRC for the downlink signal is masked by a mask which is dependent on the acknowledgment signal carrying a positive or a negative acknowledgment.

15. A terminal for use in a mobile telecommunications system, the system comprising a base station and the terminal operable to communicate with the base station via a wireless interface, wherein the terminal comprises a transmitter, a receiver and a controller, the controller being configured to:

receive via the receiver a first signal in a first frequency band;

detect that the received signal is a multiplexed signal multiplexing a downlink signal with an acknowledgment signal and that the received signal is received at a time at which the downlink signal and the acknowledgment signal were expected in an absence of multiplexing; and de-multiplex the received signal to extract the downlink signal and the acknowledgment signal.

16. A method of operating a terminal in a mobile telecommunications system, the system comprising a base station and the terminal operable to communicate with the base station via a wireless interface, wherein the method comprises:

receiving a first signal in a first frequency band;

detecting that the received signal is a multiplexed signal multiplexing a downlink signal with an acknowledgment signal and that the received signal is received at a time at which the downlink signal and the acknowledgment signal were expected in an absence of multiplexing; and de-multiplexing the received signal to extract the downlink signal and the acknowledgment signal.

\* \* \* \* \*